United States Patent
Stinchcombe et al.

(10) Patent No.: US 10,249,111 B2
(45) Date of Patent: Apr. 2, 2019

(54) METHOD AND SYSTEM FOR PROVIDING FEEDBACK TO A DRIVER OF A HYBRID OR ELECTRIC VEHICLE

(71) Applicant: Jaguar Land Rover Limited, Coventry (GB)

(72) Inventors: Paul Stinchcombe, Coventry (GB); Duncan Robertson, Coventry (GB); David Smith, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 770 days.

(21) Appl. No.: 14/784,232

(22) PCT Filed: May 1, 2014

(86) PCT No.: PCT/EP2014/058946
§ 371 (c)(1),
(2) Date: Oct. 13, 2015

(87) PCT Pub. No.: WO2014/177671
PCT Pub. Date: Nov. 6, 2014

(65) Prior Publication Data
US 2016/0049023 A1 Feb. 18, 2016

(30) Foreign Application Priority Data

May 1, 2013 (GB) .................................. 1307888.6

(51) Int. Cl.
*G06F 19/00* (2018.01)
*G07C 5/08* (2006.01)
(Continued)

(52) U.S. Cl.
CPC .............. *G07C 5/0825* (2013.01); *B60K 6/20* (2013.01); *B60K 6/48* (2013.01); *B60K 6/52* (2013.01);
(Continued)

(58) Field of Classification Search
CPC ........ B60L 15/2009; B60T 8/17; B60T 8/175; B60W 10/18
(Continued)

(56) References Cited

U.S. PATENT DOCUMENTS

2011/0023772 A1    2/2011  Crombez
2012/0078467 A1*   3/2012  Schweikl ............. B60K 26/021
                                                            701/36
(Continued)

OTHER PUBLICATIONS

Combined Search and Examination Report, GB 1307888.6, dated Oct. 28, 2013, 8 pages.
(Continued)

*Primary Examiner* — John Kwon
(74) *Attorney, Agent, or Firm* — Myers Bigel, P.A.

(57) ABSTRACT

A method of providing feedback to a driver of a hybrid or electric vehicle having an energy regeneration mode of operation is provided. The method comprises determining a distance saved value in dependence on an amount of energy recovered during the trip cycle by operation of the vehicle in the regeneration mode. The distance saved value represents the distance which could have been travelled using the recovered energy. The method further comprises displaying the determined distance saved value on a display (200) of the vehicle (100).

20 Claims, 4 Drawing Sheets

(51) Int. Cl.
*B60K 6/20* (2007.10)
*B60W 50/14* (2012.01)
*B60W 20/00* (2016.01)
*B60L 7/14* (2006.01)
*B60L 11/14* (2006.01)
*B60L 11/18* (2006.01)
*B60K 6/48* (2007.10)
*B60K 6/52* (2007.10)
*B60K 35/00* (2006.01)
*B60K 37/02* (2006.01)
*B60T 7/12* (2006.01)

(52) U.S. Cl.
CPC .............. *B60K 35/00* (2013.01); *B60K 37/02* (2013.01); *B60L 7/14* (2013.01); *B60L 11/14* (2013.01); *B60L 11/1868* (2013.01); *B60W 20/00* (2013.01); *B60W 50/14* (2013.01); *G07C 5/0808* (2013.01); *B60K 2350/1072* (2013.01); *B60K 2350/1092* (2013.01); *B60L 2240/421* (2013.01); *B60L 2240/423* (2013.01); *B60L 2250/16* (2013.01); *B60L 2260/52* (2013.01); *B60L 2260/54* (2013.01); *B60W 2510/0657* (2013.01); *B60W 2510/083* (2013.01); *B60W 2510/18* (2013.01); *B60W 2530/145* (2013.01); *B60W 2530/18* (2013.01); *Y02T 10/6221* (2013.01); *Y02T 10/6265* (2013.01); *Y02T 10/642* (2013.01); *Y02T 10/70* (2013.01); *Y02T 10/7005* (2013.01); *Y02T 10/7066* (2013.01); *Y02T 10/7077* (2013.01); *Y02T 10/84* (2013.01); *Y02T 10/92* (2013.01)

(58) Field of Classification Search
USPC .......... 701/22, 36, 70, 83, 84, 101, 114, 115
See application file for complete search history.

(56) References Cited

U.S. PATENT DOCUMENTS

| 2012/0078468 A1* | 3/2012 | Popp .................... B60K 26/021 701/36 |
| 2012/0078496 A1* | 3/2012 | Lindhuber ............ B60K 35/00 701/123 |
| 2012/0179313 A1 | 7/2012 | Hartl et al. |
| 2012/0179346 A1 | 7/2012 | Aldighieri et al. |
| 2012/0179420 A1 | 7/2012 | Gilman et al. |
| 2016/0006066 A1* | 1/2016 | Robertson ................ F01N 3/00 429/418 |

OTHER PUBLICATIONS

International Search Report, PCT/EP2014/058946, dated Sep. 30, 2014, 3 pages.

* cited by examiner

METHOD AND SYSTEM FOR PROVIDING FEEDBACK TO A DRIVER OF A HYBRID OR ELECTRIC VEHICLE

RELATED APPLICATIONS

This application is a 35 U.S.C. § 371 national stage application of PCT Application No. PCT/EP2014/058946, filed on May 1, 2014, which claims priority from Great Britain Patent Application No. 1307888.6 filed on May 1, 2013, the contents of which are incorporated herein by reference in their entireties. The above-referenced PCT International Application was published in the English language as International Publication No. WO 2014/177671 A1 on Nov. 6, 2014.

TECHNICAL FIELD

The invention relates to a method and a system for providing feedback to a driver of a hybrid or electric vehicle having an energy regeneration mode of operation. Aspects of the invention relate to a method, a system and a vehicle.

BACKGROUND

Most motor vehicles, including those that are used for private and commercial use, have a number of visual displays such as gauges, indicators and signs, which are used to assist the driver when driving, or to warn or inform the driver of a particular operation of the vehicle. Such displays may be digital or analogue and are generally located on the dashboard or front windscreen of a vehicle.

In recent times, there has been a move toward vehicles that do not run solely on fuel combustion engines, such as hybrid electric vehicles and fully electrically powered vehicles. Hybrid electric vehicles are being developed to deliver a number of benefits including the reduction of carbon dioxide emissions and the reduction of the world fuel consumption by vehicle drivers and to reduce the energy consumed by a vehicle during its day to day running. With the rise of such new technologies, new displays are being devised to assist the driver of a vehicle in understanding the technologies and how the technologies are working to deliver the benefits mentioned above.

One way in which a hybrid vehicle functions to reduce fuel consumption and carbon dioxide emissions is by converting 'waste' energy during braking into electricity through a regenerative braking system.

A regenerative braking system commonly includes an electrical machine, an Inverter and a High Voltage (HV) Battery. The electrical machine converts electrical power to mechanical power and conversely mechanical power to electrical power. The Inverter is used for the conversion of AC/DC electrical power. The Inverter is a high voltage component which converts a direct current supplied by the HV Battery and provides an alternating current to power the electrical machine when the vehicle is operating in traction mode e.g. when the vehicle is being driven forward.

When operating in a regenerative braking mode, the electrical machine operates as a generator to supply an electrical load. The electrical load creates a braking torque that is transferred via a driveline. In this way, kinetic energy is transferred from the wheels of the vehicle through the drivetrain to the electrical machine, which in turn converts the kinetic energy into electrical energy. The Inverter converts the electrical AC power regenerated by the electrical machine into High Voltage electrical DC power which in turn is used to charge the HV Battery. At the same time, the resultant electrical machine torque produced by the electric energy generation slows down the vehicle.

In addition to facilitating the powering of the vehicle in terms of traction, the HV Battery is also used for other operations for example, charging a 12 V battery, or to power an air-conditioning system of a vehicle.

The amount of energy regenerated during regenerative braking is dependent on a number of factors relating to kinetic energy. The efficiencies of a driver's driving style can influence this for example, how often the driver brakes, how hard the driver brakes and for how long the driver brakes.

Drivers are able to adapt or optimise their driving style if they have appropriate dynamic feedback and information to guide the driver to fully utilise the vehicle operation and features. However, existing displays for such vehicles do not provide a usable real-term indicator of how energy being saved by the vehicle is beneficial to the driver. Existing data representation displayed on hybrid vehicles are not in a meaningful format that the user will be able to understand and associate with driving the vehicle in an economical manner.

It is an object of the present invention to provide a method and system for providing feedback to the driver of a hybrid or electric vehicle which substantially overcomes or mitigates at least some of the above-mentioned problems.

SUMMARY OF THE INVENTION

According to an aspect of the present invention there is provided a method of providing feedback to a driver of a hybrid or electric vehicle having an energy regeneration mode of operation, the method comprising:
  determining a distance saved value in dependence on an amount of energy recovered during the trip cycle by operation of the vehicle in the regeneration mode, wherein the distance saved value represents the distance which could have been travelled using the recovered energy; and
  displaying the determined distance saved value on a display of the vehicle.

Thus, by determining a distance saved value, the energy recovered by a hybrid or electric vehicle can be meaningfully displayed in a way that is informative to a user and such that they can understand and associate with driving the vehicle in an economical manner. The distance saved value can be displayed as a commonly used unit of distance, such as miles, or kilometers. The distance saved value provides the user with energy recovery data in a format which is readily relatable to the operation of the vehicle. A determination of the distance saved value provides a direct relationship between the energy recovered by the energy regeneration mode of operation and the distance the vehicle has travelled during the trip cycle.

The distance saved value may be determined in dependence on the ratio of the regenerated energy recovered during the trip cycle to the traction energy expended propelling the vehicle during the trip cycle.

Determining the distance saved value may comprise:
  determining an Average Regenerated Energy recovered during the trip cycle; and,
  determining a distance saved value which represents the distance which could have been completed using the Average Regenerated Energy recovered.

In this way, meaningful data represented by the distance saved value can be fed back and displayed to the driver without the need for complex computational calculations.

The Average Regenerated Energy may be determined in dependence on a braking torque applied to the vehicle during operation in the regeneration mode.

The braking torque may be the torque applied to an electrical machine for converting mechanical energy into electrical energy.

The method may comprise determining an Average Traction Energy expended during the trip cycle.

The Average Traction Energy expended during the trip cycle may be determined in dependence on the torque applied to propel the vehicle during the vehicle trip cycle.

The torque applied to propel the vehicle may be determined in dependence on the torque generated by a combustion engine.

The torque applied to propel the vehicle may be determined in dependence on the torque generated by the electrical machine for converting electrical energy into mechanical energy.

The distance saved value may be calculated using the formula:

$$\frac{\text{Average Regenerated Energy}}{\text{Average Traction energy}} \times \text{distance travelled during the vehicle trip cycle.}$$

The Average Traction Energy may be determined in dependence on a Traction Power, the Traction Power calculated using the formula:

$$\text{Traction Power (kW)} = \frac{[Tc \times 2\pi \times Rc]}{60000}$$

where:
Tc=the Torque generated by the combustion engine (130) (Nm), and
Rc=a Rotational speed of the combustion engine (130) (rpm).

The Average Regenerated Energy may be determined in dependence on a Regenerated Power, the Regenerated Power calculated using the formula:

$$\text{Regeneration Power (kW)} = \frac{[Trp(Nm) \times 2\pi \times Rp]}{60000}$$

where:
Trp=the Torque regenerated by the electrical machine (110) (Nm), and
Rp=a Rotational speed of the electrical machine (110) (rpm).

According to another aspect of the invention, there is provided a system for providing feedback to a driver of a hybrid or electric vehicle having an energy regeneration mode of operation, the system comprising processing means and display means;
the processing means configured to determine a distance saved value in dependence on an amount of energy recovered during the trip cycle by operation of the vehicle in the regeneration mode, wherein the distance saved value represents the distance which could have been travelled using the recovered energy, and to display the determined distance saved value on the display means.

The processing means may be configured to determine the distance saved value is determined in dependence on the ratio of the regenerated energy recovered during the trip cycle to the traction energy expended propelling the vehicle during the trip cycle.

The processing means may be configured to determine an Average Regenerated Energy recovered during the trip cycle; and,
to determine a distance saved value which represents the distance which could have been completed using the Average Regenerated Energy recovered.

The system may comprise means for determining a braking torque applied to the vehicle during operation in the regeneration mode, the processing means being configured to determine the Average Regenerated Energy in dependence on said braking torque.

The braking torque may be the torque applied to an electrical machine for converting mechanical energy into electrical energy.

The means for determining the braking torque may comprise a torque sensor or a look-up table.

The processing means may be configured to determine an Average Traction Energy expended during the trip cycle.

The Average Traction Energy expended during the trip cycle may be determined in dependence on the torque applied to propel the vehicle during the vehicle trip cycle.

The torque applied to propel the vehicle may be determined in dependence on the torque generated by a combustion engine.

The torque applied to propel the vehicle may be determined in dependence on the torque generated by an electrical machine for converting electrical energy into mechanical energy.

The distance saved value may be calculated by the processing means using the formula:

$$\frac{\text{Average Regenerated Energy}}{\text{Average Traction Energy}} \times \text{distance travelled during the vehicle trip cycle.}$$

The system may comprise a regenerative braking system. The regenerative braking system may include a braking sensor for determining when a user applies at least one brake to a vehicle. The user may apply the or each brake by depressing a brake pedal of the vehicle to apply a braking force. The or each brake may comprise friction brakes.

The display means may be a Human Machine Interface of the vehicle. The display may be integrated with an existing display unit of a vehicle dashboard or may comprise a separate display unit. The display may comprise an analogue display screen or an electronic display screen, for example an LED or LCD screen. Alternatively, the display may be a holographic display, located towards the front windscreen of the vehicle.

The system may comprise a power converter from which the torque regenerated during the trip cycle can be measured. The electrical machine is responsive to the regenerative braking system and will regenerate torque as a direct function of the braking force applied to the vehicle. The torque regenerated by the electrical machine may be determined by an engine control unit. The engine control unit may comprise an engine model which may compare the engine demand and/or operating conditions to a pre-determined data set derived from a test engine on which a regenerated torque output has been measured over a range of operating conditions, based on a voltage or a current applied to the electrical machine.

The measurement of the torque used by the vehicle can be measured from the electrical machine.

According to another aspect of the present invention, there is provided, a vehicle comprising a system according to the previously described aspect.

The vehicle may be a hybrid electric vehicle.

The vehicle with which the system may be used may comprise a combustion engine which generates the torque used by the vehicle during the trip cycle. The torque generated by the combustion engine may be determined by an engine control unit. The engine control unit may comprise an engine model which may compare the engine demand and/or operating conditions to a pre-determined data set derived from a test engine on which a generated torque output has been measured over a range of operating conditions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings in which.

DETAILED DESCRIPTION

There will now be described by way of example a specific mode contemplated by the inventors. In the following description numerous specific details are set forth in order to provide a thorough understanding. It will be apparent to one skilled in the art however, that the present invention may be practiced without limitation to these specific details. In other instances, well-known methods and structures have not been described so as not to unnecessarily obscure the description.

Figure 1:
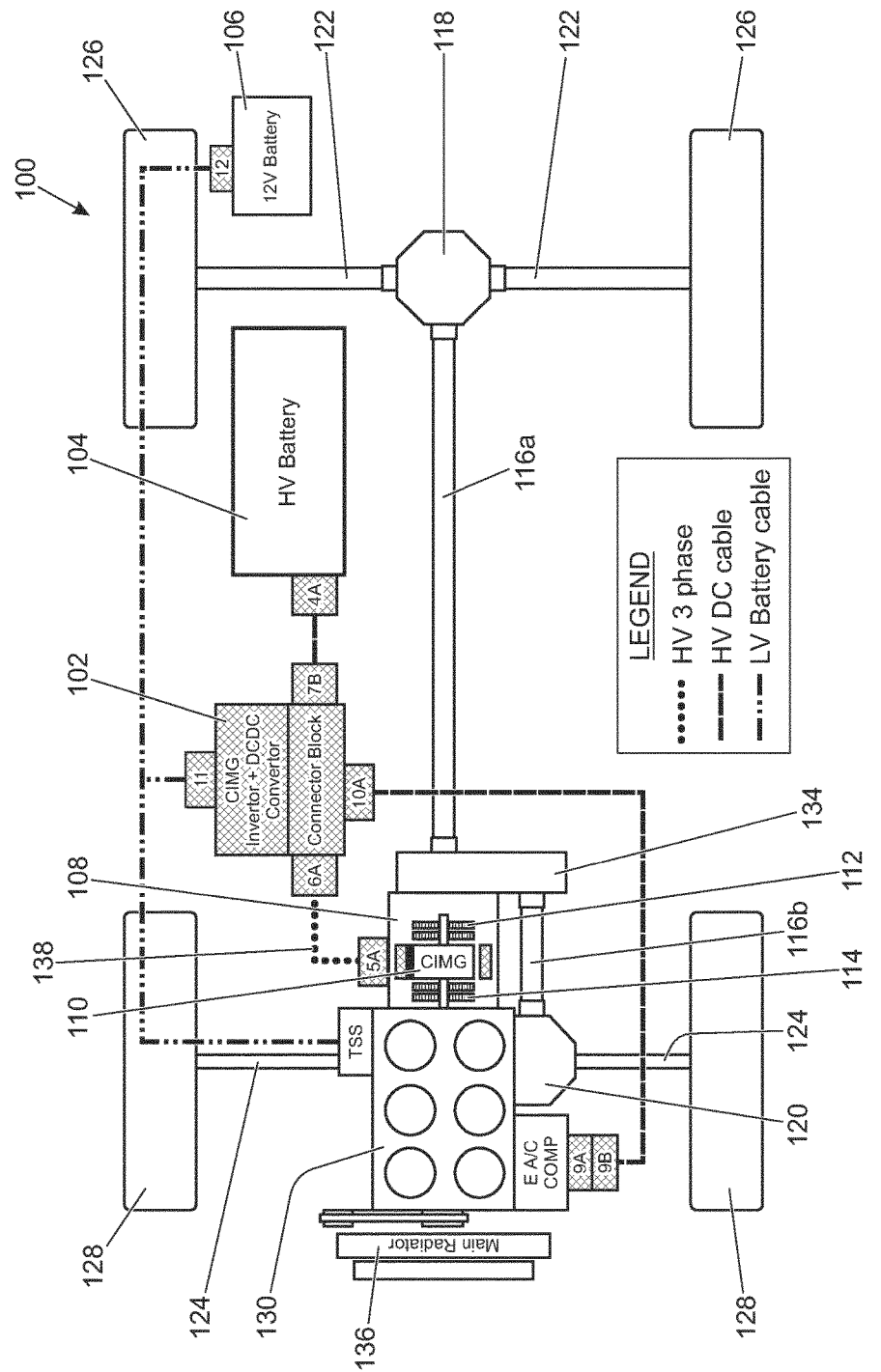
FIG. 1 illustrates schematically a vehicle according to an embodiment of the present invention.
Figure 2:
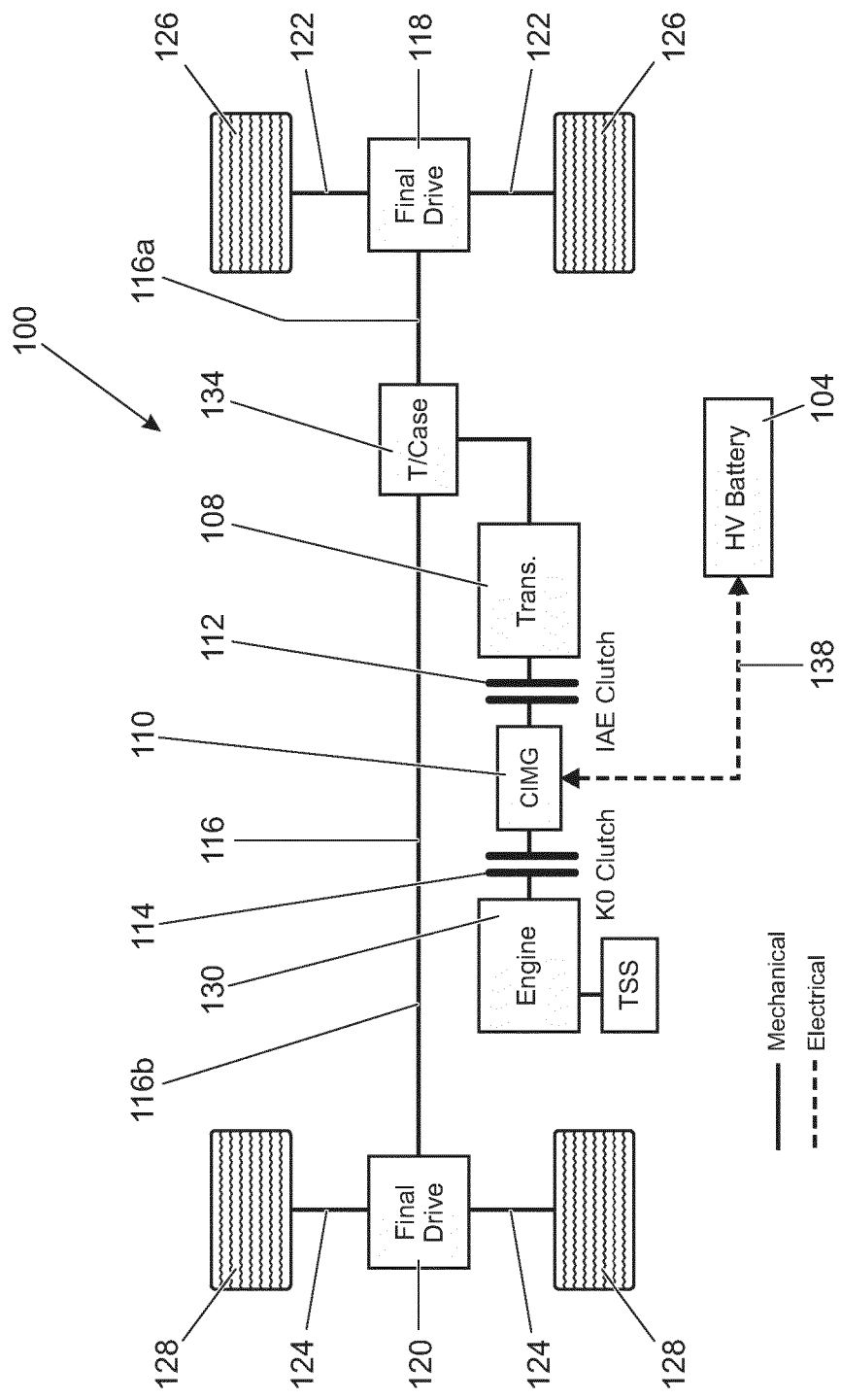
FIG. 2 illustrates an alternative scheme of the vehicle of FIG. 1.

Referring to FIGS. 1 and 2, a hybrid vehicle 100 is shown. The hybrid vehicle 100 is one which includes both a combustion engine and an electric power source, as will be described later. The hybrid vehicle 100 will be described herein as having a petrol combustion engine. However, it will be known that other combustion engines may also be used, for example diesel engines. The hybrid vehicle 100 is shown as having a four-wheel drive configuration, i.e. such that each of the wheels of the vehicle 100 is powered. However, it will also be known that rear-wheel drive vehicles and front-wheel drive vehicles (two-wheel drive vehicles), i.e. where either only the front wheels are powered or only the rear wheels are powered, may be adapted for the present invention.

A petrol engine 130 is typically located towards a front end of the hybrid vehicle 100 disposed between a set of two front wheels 128. The petrol engine 130 can be any commonly known internal combustion engine including a spark-ignition system designed to be fuelled by petrol or other known volatile fuels. The petrol engine 130 interacts with a radiator 136 located towards a front end of the vehicle 100. The petrol engine 130 is releasably coupled to an electrical machine in the form of a crankshaft integrated motor generator (CIMG) 110 through the operation of a first clutch 114. The crankshaft integrated motor generator (CIMG) 110 is connected to a crankshaft (not shown) of the engine. The crankshaft is a single input shaft. The CIMG 110 is located between the petrol engine 130 and a transmission 108. The CIMG 110 is releasably coupled to the transmission 108 system by means of a second clutch 112. The transmission 108 may take the form of a manual transmission or an automatic transmission. A manual transmission may include a manual gearbox, a continually variable transmission or any other suitable transmission.

The transmission 108 is coupled to a transfer case 134, which transmits the torque provided by the petrol engine 130 and/or the CIMG 110 between the front and rear wheels 128, 126, by means of respective forward and rear drive shafts 116b, 116a. The rear shaft 116a is connected to a rear differential 118 located towards the rear of the vehicle 100, and the front shaft 116b is connected to a front differential 120 located towards the front of the vehicle 100. The rear differential 118 cooperates with a set of two rear wheels 126 by means of a pair of rear wheel axles 122 and the front differential 120 cooperate with the set of front wheels by means of a pair of front wheel axles 124. By having a differential 118 at the rear of the vehicle 100 and a differential 120 at the front of the vehicle, the vehicle can be operated as a four-wheel drive vehicle.

The vehicle 100 also has a High Voltage (HV) battery 104 connected to connector block of an inverter 102. The inverter 102 generates a three-phase electrical supply that is supplied to the CIMG 110 by means of a three-phase cable 138. When the CIMG 110 is supplied with the three-phase electrical supply, the CIMG is operated as a motor. The HV battery 104 is also arranged to receive charge from the CIMG 110 when the CIMG 110 is operated as a generator.

The HV battery 104 is further coupled and arranged to charge a 12 Volt battery 106 of the engine.

The vehicle 100 is configured to operate in one of a hybrid electric vehicle (HEV) mode (where both the HV battery 104 and the petrol engine 130 may provide a motive torque), a HEV inhibited mode (in which the petrol engine 130 alone provides the motive torque) and a driver-selectable electric vehicle only (EV only) mode (in which the CIMG 110 provides the motive torque).

When operating in the hybrid electric vehicle (HEV) mode, the vehicle 100 operates as a hybrid powertrain. The first clutch 114 and the second clutch 112 can be operated independently so as to be independently opened and closed to manipulate the type of power transfer used to ultimately provide torque to the wheels 126, 128 of the vehicle.

The independently operable first clutch 114 and the second clutch 112 provide the vehicle 100 with a clutch mechanism which allows the transfer of mechanical power from the CIMG 110 or the petrol engine 130.

When operating in the HEV mode, the vehicle 100 is arranged so that the petrol engine 130 and the CIMG 110 can either run in a parallel boost mode or a parallel charge mode.

In the HEV parallel boost mode, the CIMG 110 operates as a secondary motor to the petrol engine 130 and is powered by the HV battery 104. When the vehicle 100 is running, the petrol engine 130 and the CIMG 110 both apply power in the form of torque to the transmission 108. The petrol engine 130 is able to apply a torque to the crankshaft through the first clutch 114, and the CIMG 110 is able to apply a torque via the second clutch 112. When operating in the HEV parallel boost mode, these two sources of traction power are effectively arranged in parallel, meaning that power can be provided by each source to drive the vehicle 100. Therefore, the total torque applied at the input to the transmission 108 will be the combination of the torque provided by the petrol engine 130 via the first clutch 114 and the torque applied by the CIMG 110 via the second clutch 112.

In this case both the first clutch 114 and the second clutch 112 are locked. The transfer case 134 transfers torque from the transmission 108, through the respective drive shafts 116a, 116b and to the rear differential 118 and the front differential 120, respectively. The rear differential 118 splits the torque transmitted via the rear drive shaft 116a and distributes it between the rear wheels 126 via the axles 122. The front differential 120 splits the torque transmitted via the forward drive shaft 116b and distributes it between the front wheels 128 through the axles 124. As both the petrol engine 130 and the CIMG 110 apply positive motive torque to the transmission 108 in the HEV mode, the vehicle 100 is driven by both mechanical and electrical power.

When operating in the HEV parallel charge mode, the petrol engine 130 is arranged to propel the vehicle 100 and the CIMG 110 acts as a generator. During the parallel charge mode, the first clutch 114 and the second clutch 112 remain locked. However, although positive torque from the petrol engine 130 is supplied to the transmission 108 to drive the wheels 126, 128, the torque generated by the CIMG 110 is converted to an electric charge. The electric charge is transferred to the inverter 102 via the three-phase cable 138 and the inverter 102 converts the received charge to a suitable electric charge to charge the HV battery 104. The inverter 102 is arranged to convert alternating current (AC) into direct current (DC) and conversely direct current (DC) into alternating current (AC).

When operating in the HEV inhibited mode, only the petrol engine 130 applies motive torque to the transmission 108. In this mode of operation, the CIMG 110 is effectively idle such that no torque is produced and the vehicle 100 is solely powered by the petrol engine 130.

In yet a further mode of operation, the vehicle 100 may operate in the full EV mode. When the vehicle operates in full EV mode, the first clutch 114 is unlocked, so that the petrol engine 130 is disengaged from the CIMG 110. By disengaging the petrol engine 130 from the CIMG 110, the petrol engine 130 cannot apply torque to the transmission 108. However, as the second clutch 112 is still locked, torque can be applied to the transmission 108 by the CIMG 110. Therefore in the EV only mode, the total torque applied to the transmission 108 is only the torque applied via the CIMG 110. The driver can operate a vehicle and select any one of the above modes of operation depending on their requirements.

The vehicle 100 also includes a powertrain controller (not shown). The powertrain controller is a device which is configured to control the CIMG 110. The mode of the CIMG 110 is manipulated by the powertrain controller to interchange the operation of the vehicle 100 between the parallel HEV mode, the parallel charge mode or the EV mode according to an energy management strategy implemented by the powertrain controller. When the vehicle 100 is being operated in one of these modes, a regenerative braking system can be employed.

In a regenerative braking system, a braking torque is preferably applied to the wheels 126, 128 of the vehicle 100 without applying friction brakes (not shown). Rather, a braking force can be applied to the vehicle 100 by virtue of an electrical load being applied to the CIMG 110 as the crankshaft rotates. This way, energy can be recovered and regenerated as electrical energy in the HV battery 104.

The vehicle 100 has a foundation braking system operable by means of a brake pedal (not shown) under the control of a foundation braking system controller (not shown) or a brake controller (not shown). The brake controller is operable to control a set of friction brakes for example, disc brakes (not shown). A separate disc brake is associated with each of the rear wheels 126 and the front wheels 128. The brake controller is further configured to operate the regenerative braking system. The brake controller is operable to apply respective disc brakes to the front wheels 128 independently of applying disc brakes to the rear wheels 126.

The brake controller is operable to control the CIMG 110 to engage the regenerative braking system when required and/or to engage the disc brakes with their respective front or rear wheels 128, 126 when required, according to a brake control strategy implemented by the brake controller.

The regenerative braking system includes a number of components including a brake pedal (not shown), which is in communication with the brake controller and the disc brakes, and the CIMG 110.

When a driver demands a brake torque by depressing the brake pedal and the brake controller has determined that regenerative braking is required, the brake controller provides a signal to the powertrain controller. The powertrain controller then affects the CIMG 110 to cause it to apply a negative torque to the front and rear wheels 128, 126.

During this regenerative braking mode the mechanical braking power transferred from the wheels 126, 128 and through the first drive 118 and the second drive 120 is converted from mechanical power to electrical power by the CIMG 110 in the form of a regenerative three-phase electric AC power. The inverter 102 converts the regenerative three-phase electric AC power to high voltage electric DC power which can charge the HV Battery 104

In addition to the foregoing, the vehicle includes a display system (not shown) which, as explained in more detail below, calculates and displays information indicative of the distance saved during a vehicle trip or journey as a function of energy recovered via the regenerative braking system, during the vehicle trip or journey.

The regenerated energy, or "Energy Recovery", can be recovered whether the vehicle 100 is operating in the electric-only mode (EV mode), the petrol engine only mode (HEV inhibited mode) or in the hybrid combined mode (HEV mode).

A method and a system for determining the energy recovered during the trip cycle is specifically suitable for the vehicle 100 which has an energy regeneration mode of operation for example, the regenerative braking system.

With an HEV vehicle of the kind described above, energy can still be recovered in the petrol engine only mode since there will usually be capacity to add charge to the HV battery 104 even if it is not being used for traction. This is because the HV battery 104 may be run down by auxiliary systems such as the air conditioning system, for example.

The calculation of a 'distance saved' value associated with a particular vehicle trip or journey will now be described. In more detail, the distance saved value corresponds to the proportion of a particular journey over which the vehicle could have been propelled using just the energy recovered by means of regenerative braking over the course of the journey. Accordingly, the distance saved value may be expressed as follows:

$$\frac{\text{Total Regenerated Energy}}{\text{Total Traction Energy}} \times \text{distance travelled during the vehicle trip cycle}$$

where the Total Regenerated Energy is the cumulative energy recovered by the regenerative braking system during the journey, and the Total Traction Energy is the combination of the energy expended by both the CIMG 110 and the petrol engine 130 in propelling the vehicle 100 throughout the course of the journey.

In one embodiment of the present invention, the distance saved value is determined as follows:

$$\frac{\text{Average Regenerated Energy}}{\text{Average Traction Energy}} \times \text{distance travelled during the vehicle trip cycle}$$

By determining the distance saved value based on the Average Traction Energy and the Average Regenerated Energy per unit distance (i.e. per mile or km), this enables the distance saved value to be updated periodically throughout the vehicle trip cycle and, therefore, provide a continuous and up to date distance saved value throughout the vehicle trip cycle, rather than only displaying the distance saved value at the end of the vehicle trip cycle. The Average Traction Energy and the Average Regenerated Energy may be determined by considering the Traction Power provided by each of the petrol engine 130 and the CIMG 110 when propelling the vehicle, and the Regenerated Power at the CIMG 110, respectively, as explained in more detail below.

The ratio of the average energy consumed by the vehicle 100 or "Average Traction Energy" to the average energy recovered by the vehicle 100 or "Average Regenerated Energy" per unit distance to determine the distance saved value is calculated by a processor of the vehicle (not shown).

The determination of the energy expended propelling the vehicle 100 is considered as the Traction Power (kW), and may be determined based on the torque applied by the CIMG 110, the petrol engine 130 or both sources.

The instantaneous Traction Power (generated by the CIMG 110) is derived from the following calculation:

$$\text{Traction Power (kW)} = [T_p(\text{Nm}) \times 2\pi \times R_p(\text{rpm})]/60000$$

Where:

$T_p$=torque applied (Nm) by the CIMG 110 (electrical machine) at the input shaft (not shown) of the transmission 108, and $R_p$=rotational speed (rpm) of the CIMG 110 (electrical machine) at the input shaft of the transmission 108.

The instantaneous Traction Power (generated by the petrol engine 130) is derived from:

$$\text{Traction Power (kW)} = [T_c(\text{Nm}) \times 2\pi \times R_c(\text{rpm})]/60000:$$

where:

$T_c$=torque generated (Nm) by the petrol engine 130 (combustion engine) at the input shaft (not shown) of the transmission 108, and $R_c$=rotational speed (rpm) of the petrol engine 130 (combustion engine) at the input shaft of the transmission 108.

Thus the Average Traction Energy provided by the petrol engine 130 and CIMG 110 can be determined, for example, by integrating the instantaneous power provided by each of them with respect to time for a given unit distance. In the present case, the Average Traction Energy is the average energy used to propel the vehicle 100 per unit distance travelled (km or miles).

Similarly the energy recovered during a regenerative braking operation can be considered as the Regenerated Power, (kW).

The instantaneous Regenerated Power (CIMG 110) is derived from:

$$\text{Regenerated Power (kW)} = [\mathit{Trp} \times 2\pi \times \mathit{Rp}]/60000$$

where:

Trp=torque regenerated (Nm) by the CIMG 110 at the input shaft (not shown) of the transmission 108, and Rp=rotational speed (rpm) of the CIMG 110 at the input shaft of the transmission 108.

The Average Regenerated Energy per unit distance can be determined, for example, by integrating the instantaneous regenerated power with respect to time. In the present embodiment, the Average Regenerated Energy is the average energy regenerated per unit distance travelled (km or miles).

The Average Regenerated Energy recovered through the regenerative braking operation during the vehicle trip cycle can therefore be used to calculate the distance saved value, which is based on the relative proportions between the average energy regenerated over the distance travelled during the vehicle trip cycle and the average traction energy used to propel the vehicle 100 over the distance travelled.

This ratio is considered as:

[Average Regenerated Energy (kW) per distance travelled during the vehicle trip cycle (km or miles)]/[Average Traction Energy (kW) per distance travelled during the vehicle trip cycle (km or miles)].

The energy regenerated may be recycled and utilised to power the vehicle 100 over the distance travelled during the vehicle trip cycle. As a result, an estimation of the distance saved with respect to the Average Traction Energy is given by;

$$\frac{\text{Average Regenerated Energy}}{\text{Average Traction Energy}} \times \text{distance travelled during the vehicle trip cycle}$$

The torque produced by the CIMG 110 and the torque produced by the petrol engine 130 each may be measured directly using a torque sensor or determined, for example, using an engine model stored in an Engine Control Unit (not shown) located on the vehicle 100.

For example, the torque applied by the petrol engine 130 may be determined by a first Engine Control Unit (not shown) based on an engine mapping formula or a simple look-up table. The torque applied is determined by comparing the petrol engine demand and/or operating conditions to data derived from a test engine on which the torque output is measured over a range of operating conditions.

In order to determine the torque applied by the CIMG 110, a CIMG Control Unit (not shown) is used. The second Engine Control Unit includes either a map or a look-up table function and is based on the voltage and/or current applied to the CIMG 110 through the inverter 102.

As explained above, the traction energy provided by the HV battery 104 is determined in dependence on the torque provided by the CIMG 110, rather than simply on the current being drawn from the HV battery 104. This is advantageous because the HV battery 104 is also used to power other components of the vehicle 100, such as the air conditioning system (not shown), or to recharge the 12V battery 106. Therefore not all of the current drawn from the HV battery 104 is used to power the vehicle 100. The traction energy provided by the petrol engine 130 is likewise determined based on the petrol engine torque.

In the present system, the average energy recovered and ultimately the distance saved value does not have to be calculated based on miles per gallon and then converting this value into energy used. The determination of petrol engine torque and/or HV battery torque therefore negates the need for complicated or processor intensive calculations.

Figure 3:
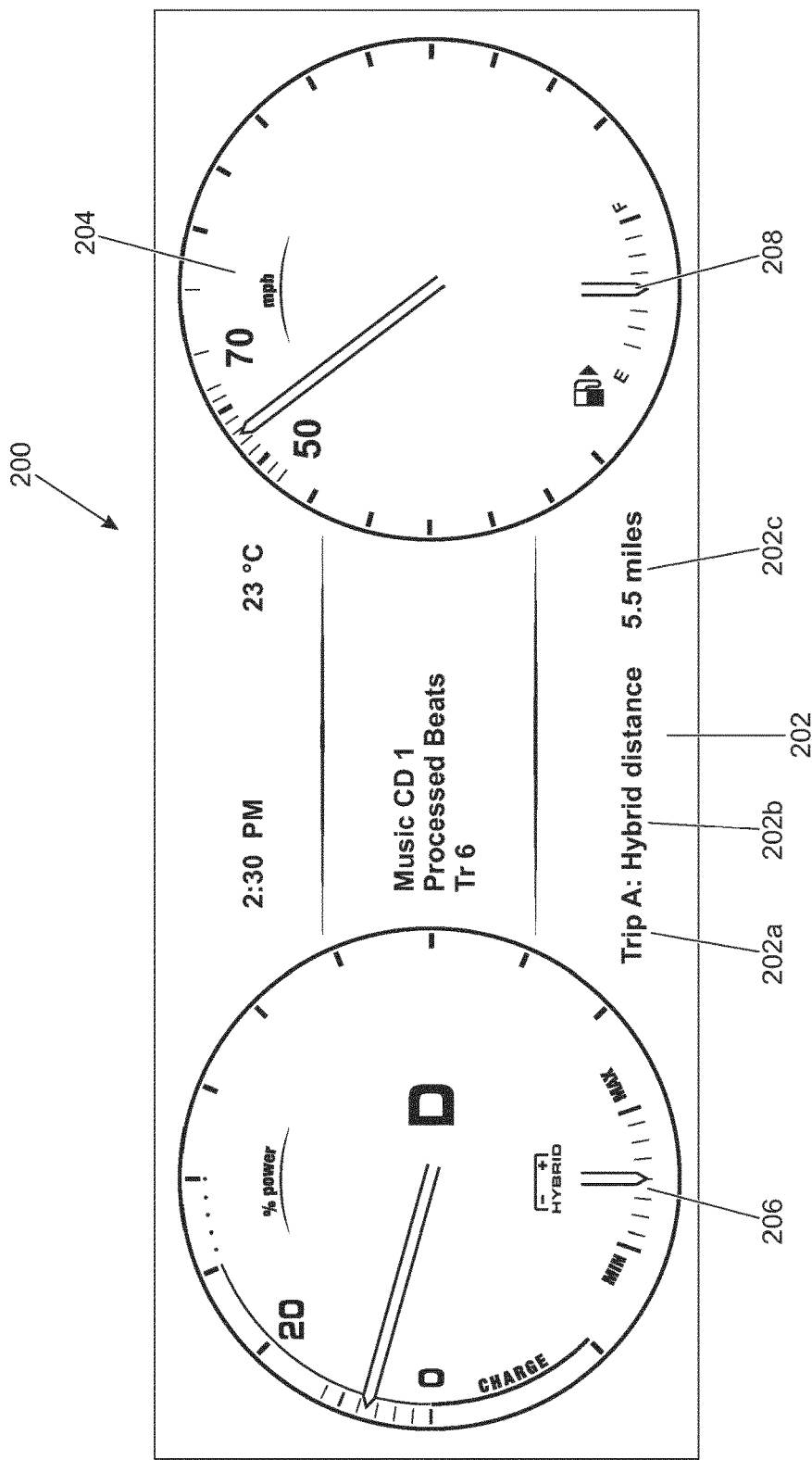
FIG. 3 illustrates a display for the vehicle of FIG. 1 and FIG. 2 according to an embodiment of the present invention.
Figure 4:
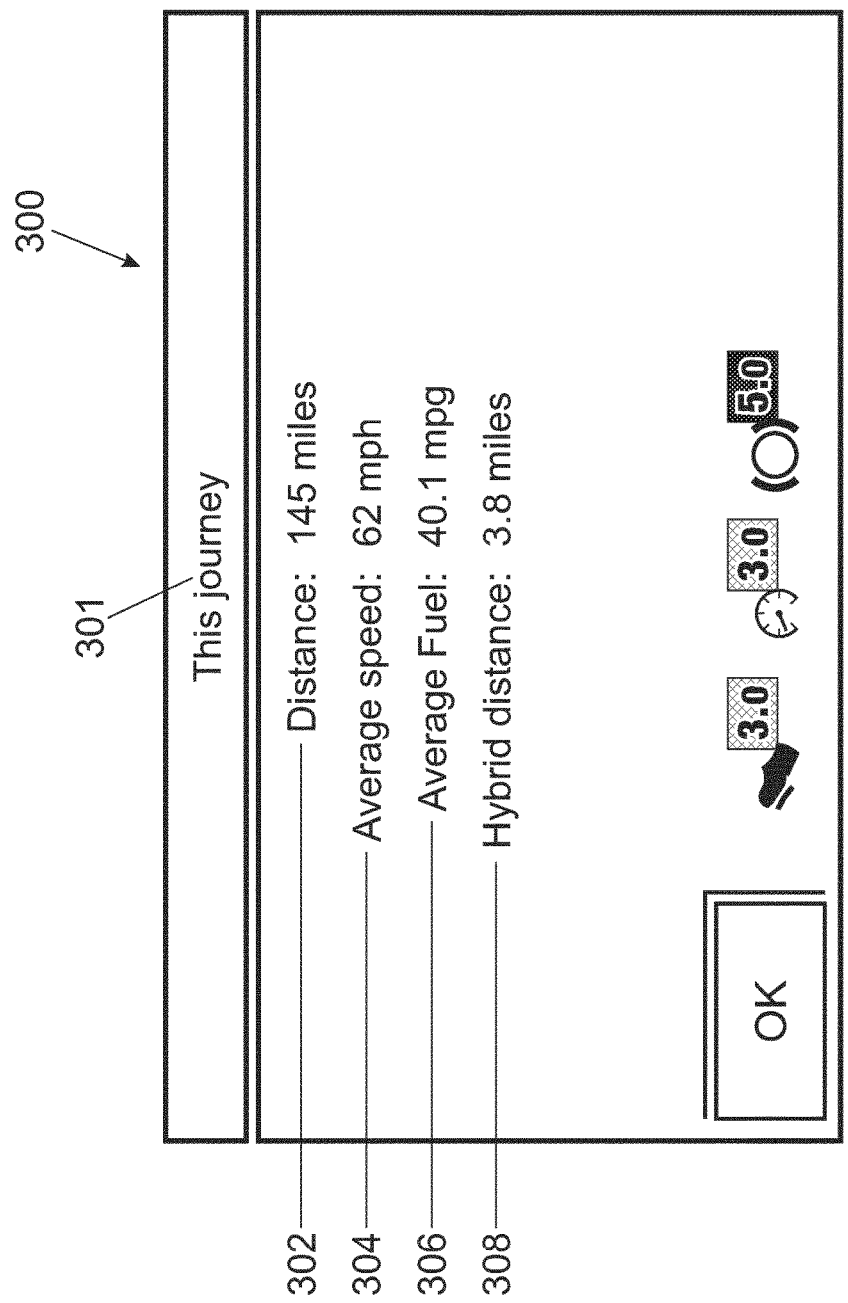
FIG. 4 illustrates an alternative display for the vehicle of FIG. 1 and FIG. 2 according to an embodiment of the present invention.

The average energy recovered calculated by the engine model is displayed as the distance saved value (km/miles) on a HMI (Human Machine Interface) display 200 of FIG. 3 and a second display 300 of FIG. 4.

Referring to FIG. 3, the HMI display 200 operates as a hybrid vehicle monitoring interface and informs the driver of the performance of various aspects of the vehicle. The HMI display 200 may be located on or near the dashboard (not shown) of the vehicle 100, such that the driver has a clear view of the HMI display 200 whilst driving. The HMI display 200 includes a first hybrid indicator dial 206, a vehicle speed dial 204, a combustion fuel indicator 208 and an energy recovered display 202. The energy recovered display 202 includes a hybrid distance indicator 202a, 202b which is displayed to the driver via the HMI 200 during a single trip (Trip A') 202a. One benefit of this is that the energy recovered is displayed as a single, simple distance saved number 202c in km or miles which the driver can readily comprehend.

The HMI display 200 features a first dial 206 for indicating the remaining capacity of the HV battery 104. The dial 206 also includes an indicator to show the % power of the HV battery 104 being used at any one instant. During a braking operation, the needle of the first dial 206 moves into a 'charge' zone indicating that energy is being reclaimed. When a driver presses on the braking pedal, there is typically an optimum braking level for regenerative braking i.e. so that the maximum amount of energy can be recovered without applying the friction brakes. If the driver deviates away from the optimum level (i.e. the driver brakes too hard) energy will be lost through heat/friction, which can't subsequently be recovered by the CIMG 110. This is because for example, if the driver presses on the brakes too hard, the friction brakes will be engaged in addition to the braking force by virtue of the electrical load applied to the CIMG 110.

Referring to FIG. 4, the second display 300 is also located at or near the vehicle dashboard. The second display 300 includes an internal storage medium, configured to store data relating to a number of previous journeys, allowing the driver to toggle through and compare them. This is useful in enabling a driver who drives the same or similar daily commute to be able to see how efficient their driving is from one day to the next. The second display 300 has a 'this journey' page 301 which provides the driver with information with respect to a single journey. The journey may be either the last driven journey or a previously stored journey.

The information displayed on the 'this journey' page 301 relates to the distance travelled 302, the average speed 304, the average fuel consumption 306 and the energy recovered calculated as a unit of distance saved 308. By providing this data on a per journey basis, it is easy to compare the efficiency of the driving style of different drivers. The second display 300 includes an interactive display and operation module (not shown). The interactive display includes a vehicle cluster menu where upon the hybrid related trip statistics of the 'this journey' page 301 are presented in a list and grouped with similar menu items.

In addition to the example of the list of FIG. 4, a further example of a statistics list is as follows and which may be displayed on the 'this journey' page:

Trip A–Hybrid distance=XX.X miles
Display resolution=0.1 (miles or km)
Minimum Displayed Value=0.0 (miles or km)
Maximum Displayed Value=9999.9 (miles or km)*

*The 'maximum displayed value' is a calculated distance using a predicted Energy Recovery for the 'most demanding' drive cycles, based on the maximum displayable trip distance, which is 9999.9 miles. The 'most demanding' drive cycles are those that afford the greatest opportunity for kinetic energy recovery through regenerated energy and re-use of the regenerated energy through the hybrid powertrain.

Example 1 below shows an engine model calculation for determining the distance saved value (km/miles) over a distance travelled during a vehicle trip cycle. The distance saved value relates to an equivalent Energy Recovery during the regenerative braking operation, during the trip cycle. The calculation is based on a ratio of the average traction energy consumed (Average Traction Energy) and the Average Regenerated Energy regenerated during the trip cycle.

Example 1

If, during a 2 mile trip cycle, a total traction energy used to propel the vehicle (Total Traction Energy) was 1 kWhr$^{-1}$ and a total regenerated energy (Total Regenerated Energy) regenerated was 0.05 kWhr$^{-1}$, then the total mileage saved would equate to 0.1 miles saved.

This calculation is based on:

$$\frac{\text{Total Regenerated Energy}}{\text{Total Traction Energy}} \times \text{distance travelled during the vehicle trip cycle}$$

An additional method step may include applying a compensation factor to the distance saved value to compensate for the system's inefficiencies, for example, inefficiencies in the power conversion and transfer during the regenerative system operation.

It will be understood that the embodiments described above are given by way of example only and are not intended to limit the invention, the scope of which is defined in the appended claims. It will also be understood that the embodiments described may be used individually or combined.

The invention claimed is:

1. A method of providing feedback to a driver of a vehicle having an energy regeneration mode of operation, the method comprising:

determining a distance saved value in dependence on an amount of energy recovered during a trip cycle by operation of the vehicle in the energy regeneration mode, wherein the amount of energy recovered is an amount of energy converted from mechanical energy to electrical energy by regenerative braking at an electrical machine, and wherein the distance saved value represents a distance which could have been travelled using the recovered energy; and displaying the determined distance saved value on a display of the vehicle wherein the distance saved value is determined in dependence on a ratio of the energy recovered during the trip cycle to one of:
  i) traction energy expended by the electrical machine propelling the vehicle during the trip cycle; or
  ii) traction energy expended by the electrical machine and a combustion engine propelling the vehicle during the trip cycle.

2. The method according to claim 1 wherein determining the distance saved value comprises:
  determining an Average Regenerated Energy recovered during the trip cycle; and,
  determining a distance saved value which represents a distance which could have been completed using the Average Regenerated Energy recovered.

3. The method according to claim 2, wherein the Average Regenerated Energy is determined in dependence on a braking torque applied to the vehicle during operation in the regeneration mode.

4. The method according to claim 3, wherein the braking torque is torque applied to an electrical machine for converting mechanical energy into electrical energy.

5. The method according to claim 2, comprising determining an Average Traction Energy expended during the trip cycle.

6. The method according to claim 5, wherein the Average Traction Energy expended during the trip cycle is determined in dependence on a torque applied to propel the vehicle during the vehicle trip cycle.

7. The method according to claim 6, wherein the torque applied to propel the vehicle is determined in dependence on a torque generated by a combustion engine.

8. The method according to claim 5, wherein the distance saved value is calculated using the formula:

$$\frac{\text{Average Regenerated Energy}}{\text{Average Traction Energy}} \times \text{distance travelled during the vehicle trip cycle.}$$

9. The method according to claim 7, wherein the Average Traction Energy is determined in dependence on a Traction Power, the Traction Power calculated using the formula:

$$\text{Traction Power (kW)} = \frac{[Tc \times 2\pi \times Rc]}{60000}$$

where:
Tc=the Torque generated by the combustion engine (Nm), and
Rc=a Rotational speed of the combustion engine (rpm).

10. The method according to claim 4, wherein the Average Regenerated Energy is determined in dependence on a Regenerated Power, the Regenerated Power calculated using the formula:

$$\text{Regeneration Power (kW)} = \frac{[Trp(Nm) \times 2\pi \times Rp]}{60000}$$

where:
Trp=the Torque regenerated by the electrical machine (Nm), and
Rp=a Rotational speed of the electrical machine (rpm).

11. A system for providing feedback to a driver of a hybrid or electric vehicle having an energy regeneration mode of operation, the system comprising a processor and display;
  the processor configured to determine a distance saved value in dependence on an amount of energy recovered during a trip cycle by operation of the vehicle in the energy regeneration mode, wherein the amount of energy recovered is an amount of energy converted from mechanical energy to electrical energy by regenerative braking at an electrical machine, and wherein the distance saved value represents a distance which could have been travelled using the recovered energy and is determined in dependence on a ratio of the energy recovered during the trip cycle to one of:
    i) traction energy expended by the electrical machine propelling the vehicle during the trip cycle, or
    ii) traction energy expended by the electrical machine and a combustion engine propelling the vehicle during the trip cycle;
  and to display the determined distance saved value on the display.

12. The system according to claim 11, the processor configured to determine an Average Regenerated Energy recovered during the trip cycle and to determine a distance saved value which represents a distance which could have been completed using the Average Regenerated Energy recovered.

13. The system according to claim 12, comprising a torque sensor or a look-up table configured to determine a braking torque applied to the vehicle during operation in the energy regeneration mode, the processor configured to determine the Average Regenerated Energy in dependence on said braking torque.

14. The method according to claim 13, wherein the braking torque is torque applied to an electrical machine for converting mechanical energy into electrical energy.

15. The system according to claim 12, the processor configured to determine an Average Traction Energy expended during the trip cycle.

16. The system according to claim 15, wherein the Average Traction Energy expended during the trip cycle is determined in dependence on a torque applied to propel the vehicle during the vehicle trip cycle.

17. The system according to claim 16, wherein the torque applied to propel the vehicle is determined in dependence on a torque generated by a combustion engine and/or a torque generated by an electrical machine for converting electrical energy into mechanical energy.

18. The system according to claim 15, wherein the distance saved value is calculated by the processor using the formula:

$$\frac{\text{Average Regenerated Energy}}{\text{Average Traction Energy}} \times \text{distance travelled during the vehicle trip cycle.}$$

19. A vehicle comprising the system of claim 11.

20. The vehicle according to claim 19, wherein the vehicle is a hybrid electric vehicle.

\* \* \* \* \*